United States Patent
Yang et al.

(10) Patent No.: US 11,645,737 B2
(45) Date of Patent: May 9, 2023

(54) SKIN MAP-AIDED SKIN SMOOTHING OF IMAGES USING A BILATERAL FILTER

(71) Applicant: INTEL CORPORATION, Santa Clara, CA (US)

(72) Inventors: Liu Yang, Beijing (CN); Weike Chen, Beijing (CN); Lin Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 17/497,555

(22) Filed: Oct. 8, 2021

(65) Prior Publication Data
US 2022/0028042 A1 Jan. 27, 2022

Related U.S. Application Data (63) Continuation of application No. 16/079,308, filed as application No. PCT/CN2016/077256 on Mar. 24, 2016, now Pat. No. 11,176,641.

(51) Int. Cl.
*G06T 5/00* (2006.01)
*G06T 5/20* (2006.01)

(52) U.S. Cl.
CPC .............. *G06T 5/002* (2013.01); *G06T 5/005* (2013.01); *G06T 5/20* (2013.01); *G06T 2207/20028* (2013.01); *G06T 2207/30088* (2013.01); *G06T 2207/30201* (2013.01)

(58) Field of Classification Search
CPC . G06T 2207/20028; G06T 2207/30088; G06T 2207/30201; G06T 5/002; G06T 5/005; G06T 5/20
See application file for complete search history.

(56) References Cited

U.S. PATENT DOCUMENTS

| | | | | |
|---|---|---|---|---|
| 9,262,670 | B2* | 2/2016 | Pietilä | H04N 19/17 |
| 11,176,641 | B2* | 11/2021 | Yang | G06T 5/002 |
| 2008/0291330 | A1* | 11/2008 | Vakrat | H04N 5/217 |
| | | | | 348/607 |
| 2008/0298704 | A1 | 12/2008 | Nachlieli et al. | |

(Continued)

FOREIGN PATENT DOCUMENTS

| | | |
|---|---|---|
| CN | 101404082 A | 4/2009 |
| CN | 101765862 A | 6/2010 |

(Continued)

OTHER PUBLICATIONS

Chen, et al., "Automatic Skin Color Beautification", Dept. of Computer Science and Information Engineering, National Taiwan University, 2010, pp. 157-164.

(Continued)

*Primary Examiner* — Charles T Shedrick
(74) *Attorney, Agent, or Firm* — Hanley, Flight & Zimmerman, LLC (57) ABSTRACT

Skin smoothing is applied to images using a bilateral filter and aided by a skin map. In one example a method includes receiving an image having pixels at an original resolution. The image is buffered. The image is downscaled from the original resolution to a lower resolution. A bilateral filter is applied to pixels of the downscaled image. The filtered pixels of the downscaled image are blended with pixels of the image having the original resolution, and the blended image is produced.

20 Claims, 4 Drawing Sheets

(56) References Cited

U.S. PATENT DOCUMENTS

| | | | |
|---|---|---|---|
| 2010/0166304 A1 | 7/2010 | Chen-Hung et al. | |
| 2012/0250995 A1* | 10/2012 | Matsumoto | G06T 5/20 382/167 |
| 2014/0328509 A1* | 11/2014 | Guissin | G06T 5/20 382/100 |
| 2016/0086316 A1* | 3/2016 | Lee | H04N 9/643 382/167 |
| 2019/0057491 A1* | 2/2019 | Yang | G06T 5/005 |
| 2022/0028042 A1* | 1/2022 | Yang | G06T 5/20 |

FOREIGN PATENT DOCUMENTS

| | | |
|---|---|---|
| CN | 101902547 A | 12/2010 |
| CN | 102737364 A | 10/2012 |

OTHER PUBLICATIONS

Kass, et al., "Smoothed Local Histogram Filters", Pixar Animation Studios and Standford University, ACM Transactions on Graphics, vol. 29, No. 4, Article 100, Publication date: Jul. 2010, pp. 100.1-100.10.

PCT/CN2016/077256, "International Search Report" and "Written Opinion of the International Searching Authority", State Intellectual Property Office of the P.R. China, dated Dec. 14, 2016, pp. 1-11.

Paris et al., Bilateral Filtering: Theory and Applications, Now Publishers Inc, Foundations and Trends in Computer Graphics and Vision, vol. 4, No. 1, 2008, 75 pages.

Wikipedia, Bilateral filter, retrieved from https://en.wikipedia.org/wiki/Bilateral_filter, last edited date Dec. 1, 2020, 5 pages.

PCT/CN2016/077256, "International Preliminary Reporton Patentability", State Intellectual Property Office of the P.R. China, dated Sep. 25, 2018, pp. 1-4.

U.S. Appl. No. 16/079,308, "Non-Final Office Action", United States Patent & Trademark Office, dated Jan. 6, 2021, pp. 1-14.

U.S. Appl. No. 16/079,308, "Non-Final Office Action", United States Patent & Trademark Office, dated Feb. 6, 2021, pp. 1-9.

U.S. Appl. No. 16/079,308, "Final Office Action", United States Patent & Trademark Office, dated Jul. 14, 2020, pp. 1-11.

U.S. Appl. No. 16/079,308, "Notice of Allowance and Fee(s) Due", United States Patent & Trademark Office, dated Jul. 12, 2021, pp. 1-6.

* cited by examiner

SKIN MAP-AIDED SKIN SMOOTHING OF IMAGES USING A BILATERAL FILTER

RELATED APPLICATIONS

This patent arises from a continuation of U.S. patent application Ser. No. 16/079,308, which has a § 371 date of Aug. 23, 2018, which was a national stage application of International Patent Application Number PCT/CN2016/077256, which was filed on Mar. 24, 2016. U.S. patent application Ser. No. 16/079,308 and International Patent Application Number PCT/CN2016/077256 are hereby incorporated herein by reference in their entireties. Priority to U.S. patent application Ser. No. 16/079,308 and International Patent Application Number PCT/CN2016/077256 are hereby claimed.

FIELD

The present description relates to image processing and, in particular, to smoothing skin in images using a bilateral filter and a skin map.

BACKGROUND

As compact, portable, and wearable devices feature ever better cameras, these cameras are used to capture ever more pictures. In many cases, camera users want to apply some type of filtering or image modification to improve the appearance of the images. This may apply whether the images are self-portraits, portraits of others, scenic images, or recordings of events. For cellular telephone users, applications have been developed to allow users to upload images, modify the images on a server, and then post the images on the server for others to view. Other applications allow images to be edited directly by a cellular telephone. Powerful photo editing applications are available for use directly on some smart phones.

The available image editing may be to reduce noise, enhance features that are difficult to see or to improve the appearance of certain features. Some filters change the overall color balance of the image or the color of particular features to obtain a more interesting or more pleasing effect. For portraits, image editing is used to remove certain features, such as stray hair or skin blemishes or to enhance certain features such as eye color or eyelashes. Images may also be edited to make skin or other features appear more vibrant or smoother. Some mobile devices provide face beautification tools along with the camera or as a part of other portrait or face-related applications.

Bilateral filtering is a non-linear technique that can blur an image while respecting strong edges. Its ability to decompose an image into different scales without causing haloes after modification has made it ubiquitous in computational photography applications such as tone mapping, style transfer, relighting, and denoising. It has been used to make skin surfaces smoother, reducing detail in a skin surface while retaining edges. This can have the effect of removing blemishes, freckles, and other discontinuities in the skin, even small hairs.

A bilateral filter replaces each pixel by a weighted average of the nearby pixels. The size and the contrast of the features to be preserved may be set as filter parameters. The filtering may be performed through multiple iterations. The number and nature of the iterations may be set as another parameter. This allows the bilateral filter to remove most texture, noise, and fine detail. The degree to which these things are removed may be adjusted by the filter parameters.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Skin smoothing may be achieved in portraits on a camera-equipped device in real time using a bilateral filter. This skin smoothing may be integrated into a larger face beautification or photo editing system to improve images and create higher user satisfaction.

A bilateral filter in the present context is an edge preserving and noise reducing filter. A bilateral filter may be used to eliminate freckles and wrinkles appearing on faces in an image. Instead of using a constant filter template like a Gaussian filter, a bilateral filter may be used to compute template coefficients at every pixel location. The template coefficients take color information from the neighboring pixels into consideration. This improves the results from the bilateral filter but requires significant computation resources. As described herein, high performance skin smoothing is performed using a bilateral filter even on mobile platforms for which computation resources are greatly limited.

High quality face and skin smoothing is provided. This enhances the user experience of some types of visual applications. The techniques described herein may be integrated into a face and skin beautification solution on a variety of different platforms. The described approaches may be applied to various skin related beautification operations, such as smoothing, whitening, browning, wrinkle-eliminating, etc. to camera images and video streams.

The described approaches downscale the raw input image and apply a bilateral filter only on the downscaled image to save computational cost. They leverage the GPU (Graphics Processing Unit) or image processor power, when available, to smoothen the downscaled image. They use a skin-map to blend the downscaled and smoothed image with the original image. This has an effect of upscaling face areas of the downscaled and smoothed image. The upscaled areas are then combined with the non-face areas of the original image.

Figure 1:
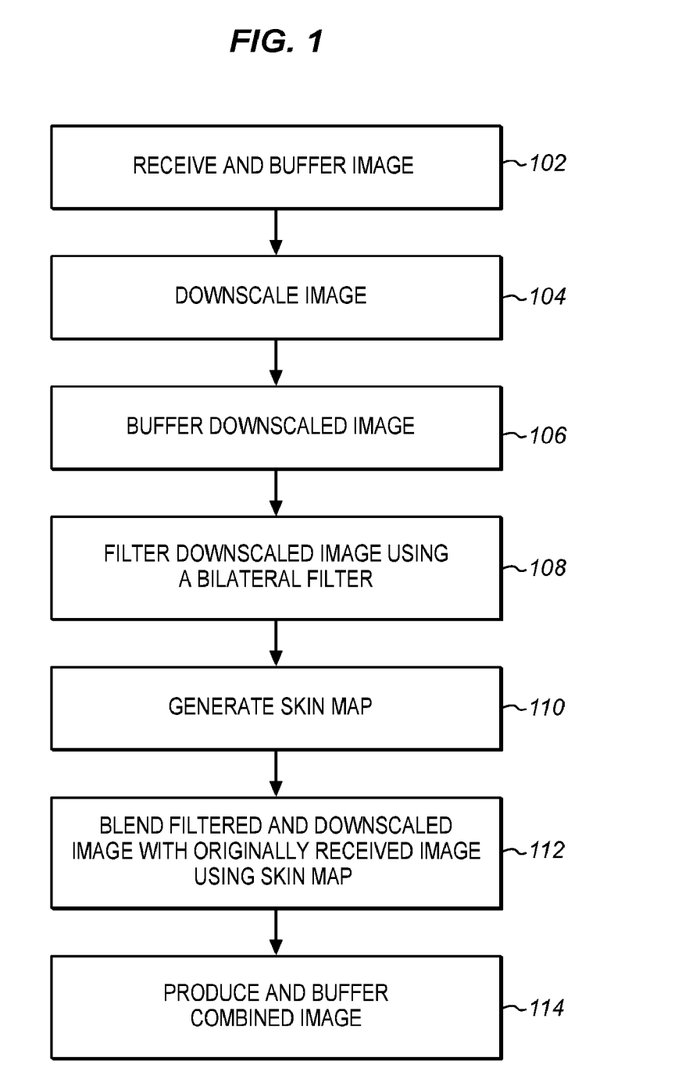
FIG. 1 is a process flow diagram of filtering an image according to an embodiment.

FIG. 1 is a process flow diagram for face beautification as described herein. At 102 an image is received and buffered at an image processor, a graphics processor, or any other type of processor. At 104 the image is downscaled. In other words the full image is reduced from the received number of pixels to a lower number of pixels. The image may be downscaled to ¼, ⅛, or some other reduced size. The image accordingly covers the same field but has fewer pixels. At 106 the downscaled image is buffered in addition to the buffered received image.

The downscaling may be performed in any of a variety of different ways. In one example, the color brightness values for each pixel of a cluster of four pixels in two rows and two columns are averaged and the average is used as a single pixel value in the ¼ downscaled image. More complex techniques may be used to preserve edges and other changes. The values may be factored to accommodate and preserve high and low brightness areas. Different downscaling techniques may be used for different types of color spaces, such as RGB, YUV, Bayer pattern, etc.

At 108, the downscaled image is filtered using a bilateral filter. The filtering may be applied to an entire image or only to certain areas of pixels or areas of the image that are identified as including faces. There are many different optimization strategies for bilateral filters such as a separable kernel, a local histogram etc. Any of a variety of different optimizations may be used alone or in combination with other techniques.

At 110 a skin map is generated using either the downscaled or the originally received image. The skin-map provides a structure which records the likelihood for each pixel that the pixel corresponds to human skin. The skin map may be generated in any of a variety of different ways. At 112 the filtered and downscaled image is blended with the originally received image using the skin map. For pixels of the original image that correspond to human skin, the filtered pixels of the downscaled image are blended with the pixels of the original image. As an alternative, the pixels may be substituted. At 114 the combined image is produced and buffered by the processing agent that performs the filtering.

The skin map may be determined before or after the image is downscaled. The skin map may be used so that only skin pixels are filtered in order to reduce the amount of filtering. Similarly the downscaling may be applied only to areas that include or are near pixels corresponding to skin as defined in the skin map. In this way the skin map may be used to reduce the amount of pixels that are processed to perform the bilateral filter.

The process shown in FIG. 1 is a simple yet effective solution that provides a very pleasing result for skin smoothing. Many bilateral filter optimization strategies have approximate or recursive solutions, which are computationally complex and do not provide the pleasing results of the present approach. The described approach is a simple yet graceful way to preserve details in the areas that are not skin (such as hair or clothing) while strengthening the smoothing effect to the skin areas using the skin-map.

The approach of FIG. 1 reduces computations because the filtering is performed on a downscaled image. In addition it provides very high quality results. Table 1 lists performance data for an OPENGL implementation with an Intel™ instruction set of the process of FIG. 1 for a VGA input image and for a 720p input image on a particular computing tablet. This implementation achieved 354 fps and 177 fps, for the VGA and 720p images respectively. This is more than fast enough to perform the filtering on a video in real time.

TABLE 1

Performance Data on an example tablet

| Image Resolution | Running Time/ms | FPS |
| --- | --- | --- |
| 1280x720 | 5.63 | 177 |
| 640x480 | 2.82 | 354 |

The process of FIG. 1 may also be described in pseudo code as NEW_BF below.

NEW_BF(IMAGE rawImg, IMAGE skinMap)

```
1  width = rawImg.width
2  height = rawImg.height
3    IMAGE downscaleImg = rawImg.downscale(width/2, height/2)
4  downscaleImg = GPU_StandardBilaterFilter(downscaleImg)
5  IMAGE result = CreateEmptyImage(width, height)
6  for each normalized coordinate (x, y)
7      do weight = skinMap.getSkinLikelihood(x, y)
8          result[x, y] = (1 − weight) * rawImg[x, y] + weight * downscaleImg[x, y]
9  return result
```

The inputs are the raw image rawImg, and the skin map IMAGE skinMap.

Lines 1 and 2 define the values of the parameters width and height. These are the total numbers of pixels of the original raw image in the two orthogonal directions.

In line 3, the input image, defined as rawImg, is downscaled by half in both the width and the height dimensions by a downscaleImg function. The amount of downscaling may be adapted to suit different image sizes and different uses of the final image. In line 4 a graphics processing unit applies a bilateral filter to the downscaled image by a GPU_StandardBilaterFilter function. This may be a standard or conventional bilateral filter or the bilateral filter may be modified in any of a variety of different ways to suit the intended end use of the image.

Considering the processing resources that are required for the filter, by downscaling the image in line 3 to have one fourth the pixels of the original image the computation cost of the bilateral filter is also reduced to one fourth or by 75%. As described, the standard bilateral filter is applied in line 4 to the downscaled image. This image is read for each pixel, in a neighborhood area (e.g. 5×5 rectangle, etc.). The template coefficients computed and then the weight sum is determined as the result. The bilateral filter operation of line 4 can leverage the parallel computation power of a GPU because there is no data dependence between the filter operations of any two pixels.

In lines 6, 7, and 8 the filtered pixels are blended into the original image. This is done using normalized coordinates, however, the downscaled coordinates may be used as an alternative. To start the blending of filtered pixels into the original image, in line 7, a weight is assigned to the likelihood that a pixel at location (x, y) corresponds to skin in the image. The weight at (x, y) is a floating value from 0 to 1 indicating the probability of the pixel at location (x, y) being a skin-pixel. These weights are taken from a skin map that is generated in a separate process. In some embodiments, the skin map generator generates a weight for each pixel. The weight indicates the likelihood that the corresponding is skin or not skin.

At line 8 the pixels of the two versions of the image are blended. In summary, the more that the pixel is likely to be a skin-pixel, the larger the influence of the filtered component from the downscaled yet smoothed image. As shown in the pseudocode example, the downscaled image pixel is factored by a first factor which, in this case, is simply the skin weight. The original pixel is factored by a second factor which is one minus the skin weight, the two factored pixel values are then added together. The particular formula uses weights between 0 and 1 [0,1], however, the factors may be modified to suit other kinds and formats of weights. The weights, the factors, or the use of the factors may be modified to suit different skin map systems.

In the blending, the two different resolution scales must be compensated. If the image is reduced by half in two dimensions, then one pixel of the downscaled image corresponds to four pixels of the original image. When the blending is done, the same downscaled pixel value will be applied to all four pixels. As another alternative, the filtered downscaled pixel may be separately blended with each raw image pixel in the group of four. This allows for a different value for each pixel after blending.

Due to the weighting, pixels that are definitely not skin receive no blending, while pixels that are definitely skin receive a large amount of blending up to replacing the raw image pixels with a filtered pixel. Other areas for which the skin map is uncertain will receive a smaller amount of blending. The blending may also use thresholds applied to the weights or the skin map generator may incorporate thresholds. In this way any area with a probability less than a low threshold, for example 0.3, may be considered to be not skin and receive no blending. Any areas with a probability greater than a high threshold, for example 0.7, may be considered skin and be replaced with filtered pixel values. The particular threshold values may be selected based on the nature of the skin map generator, the camera, and the desired results.

Figure 2:
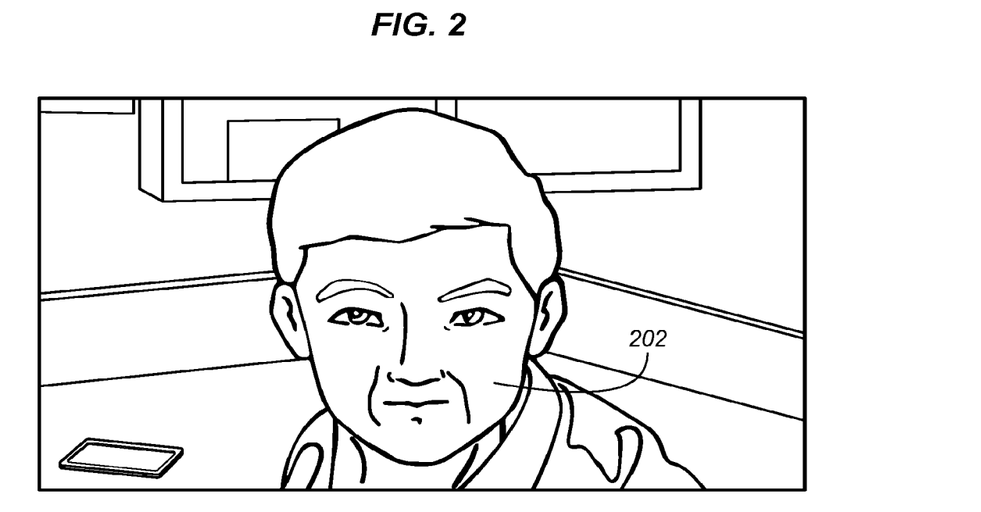
FIG. 2 is a diagram of an image suitable for filtering according to an embodiment.
Figure 3:
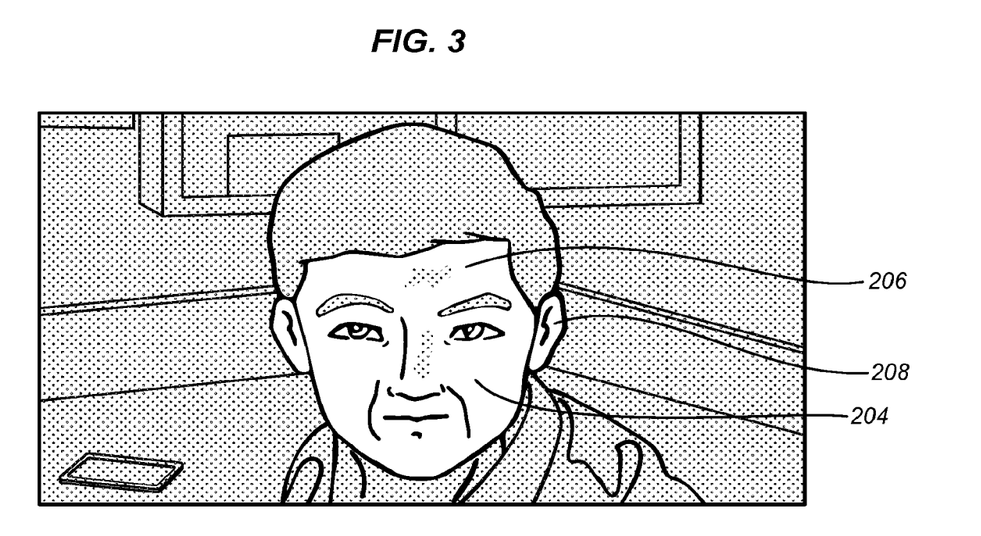
FIG. 3 is a diagram of a skin map of the image of FIG. 2 for use in filtering according to an embodiment.

FIG. 2 is a diagram of an image suitable for use with the skin smoothing approach described herein. The image features a person 202 in an office environment. FIG. 3 is a diagram of a skin map for the same image. As shown skin-areas such as face 204, forehead 206 and ears 208 have larger weight values shown as lighter or no shading, while non-skin areas such as hair, eyebrows, and background have significantly lower weight values shown as darker shading. The shading is a representation of the value of a weight or likelihood for each pixel that the pixel is in an area that corresponds to skin. The weight may be used as a scaling factor for how much skin smoothing should be applied to a particular pixel. For the face, the largest amount of skin smoothing is used. The pixels may be taken directly from the bilateral filter. For the desk, the pixels may be taken direct from the original image with no bilateral filtering. For intermediate areas some blending may be used.

Therefore, in the resulting blended image, pixels within skin area are mainly sampled from the downscaled and smoothed image while pixels within non-skin areas such as the hair and office environment are mainly sampled from the original image.

In a resulting image the wrinkles, pores, spots, and blemishes will look much smoother. Meanwhile, non-skin area details such as hair, clothes, and office items in the background will have little or no loss of detail or sharpness.

While there is a great computational savings from filtering pixels from the downscaled image, this does not reduce the quality in the final image. First, the downscaled image mainly impacts the skin areas such as the face, the forehead etc. which are generally flat. Generally, the bilateral filter will reduce noise in both the spatial and color space. However, in the flat areas, the bilateral filter behaves similar to a single spatial Gaussian filter. The skin areas from the downscaled and smoothed image that are upscaled using interpolated spatial operators further add to the effectiveness of the skin smoothing rather than introducing a quality loss. Second, the non-face areas are changed very little, if at all by the downscaled image. These areas have the same quality as before.

Third, the edges between skin and non-skin areas are preserved. The appearance of strong edges makes the image appear to be high quality. The edges are preserved first because the bilateral filter that is applied to the downscaled image is itself an edge preserving filter. The edges are also preserved because the variance of the skin-map values is significant along the edges of skin and non-skin areas. This helps preserve the edge in the final blended result.

Figure 4:
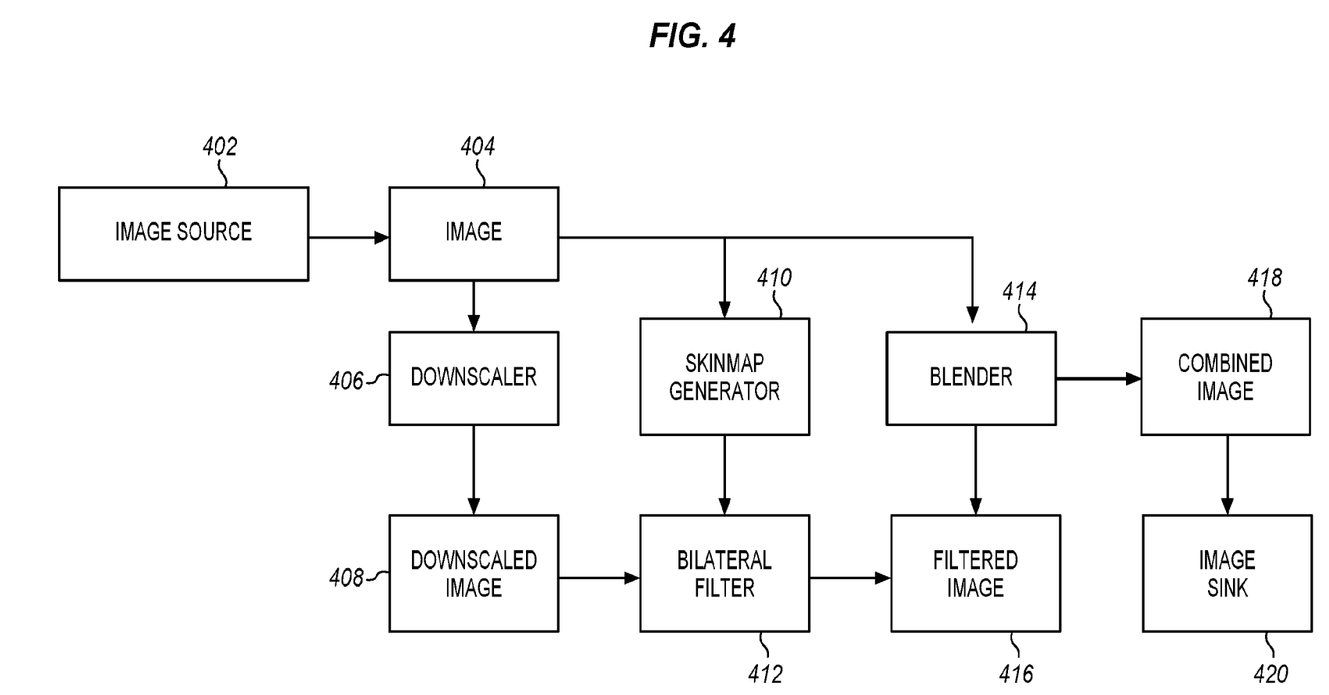
FIG. 4 is a block diagram of a system for filtering an image according to an embodiment.

FIG. 4 is a block diagram of a system for smoothing skin areas according to some embodiments. Images are received from an image source 402 to a buffer 404. The image source may be a camera, a storage device, a network or other communications interface, or another source of images. The buffered image 404 is then passed to a connected downscaler 406 which stores the downscaled image in a second image buffer 408. The downscaled image is then passed to a connected bilateral filter 412. The bilateral filter is connected to a third buffer 416 to store the filtered, downscaled image.

The originally received image is passed from the buffer to a connected skin map generator 410. The skin map generator may be connected to the bilateral filter so that only areas of the downscaled image that correspond to skin are filtered. In some embodiments, if the skin map generator produces a probability or weight that an area is skin, then the areas that have a weight that is higher than a predetermined threshold, e.g. 0.5 or 50% are filtered. The other areas are not filtered. In the example image of FIG. 3, less than a third of the image corresponds to skin areas. By filtering only skin areas, the required process is again reduced by two thirds.

The skin map generator is connected to an image blender 414. This blender receives the original image from the first buffer 404 and the filtered downscaled image from the third buffer 416 and combines the pixels of the two images as described above based on the probabilities or weights from the skin map generator. The combination is produced as a combined image that is stored in a final output buffer 418. The final image may then be provided to an image sink 420. This may be a storage device, transmission or communication interface, or a display, or a combination of these kinds of devices, depending on the particular implementation.

Figure 5:
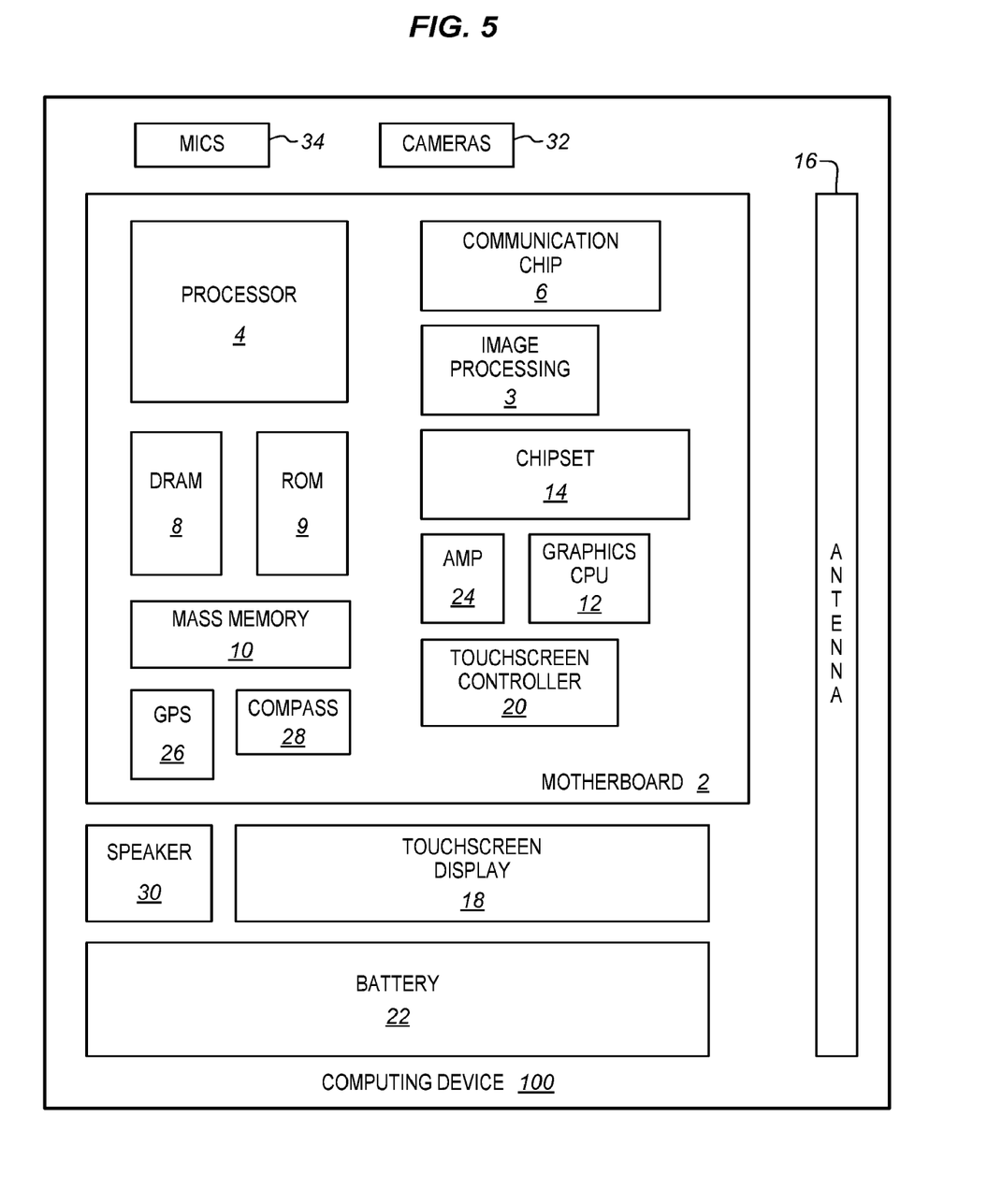
FIG. 5 is a block diagram of a computing device incorporating image filtering according to an embodiment.

FIG. 5 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as a hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 36 to perform format conversion, coding and decoding, scaling, filtering, and blending as described herein. The processor 4 is coupled to the image processing chip to drive the processes, set parameters, etc. Alternatively, the main processor or a graphics processor may perform some or all of these functions. The display is coupled to the processors to show the results and any intermediate images.

In various implementations, the computing device 100 may be eyewear, a laptop, a netbook, a notebook, an ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be a portable camera, a fixed security or studio camera, a video terminal, or a teleconferencing node. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving an image having pixels at an original resolution. The image is buffered. The image is downscaled from the original resolution to a lower resolution. A bilateral filter is applied to pixels of the downscaled image. The filtered pixels of the downscaled image are blended with pixels of the image having the original resolution, and the blended image is produced Further embodiments include generating a skin map of the image having the original resolution and wherein blending comprises using pixels of the filtered image for areas indicated as skin by the skin map.

In further embodiments generating a skin map comprises generating a weight for each pixel indicating the probability that each pixel corresponds to skin and wherein using pixels of the filtered image comprises applying the weight to combine a pixel of the image at the original resolution with a pixel of the filtered image.

In further embodiments applying the weight comprises multiplying a pixel of the filtered image by a first factor based on the weight, multiplying a corresponding pixel of the image of the original resolution by a second factor based on the weight, and then adding the two factored pixels.

In further embodiments blending comprises using only pixels of the image having the original resolution for areas indicated as not skin by the skin map.

In further embodiments downscaling comprises downscaling the image to one half the width and one half the height of the original resolution.

Further embodiments include generating a skin map of the image having the original resolution and wherein applying a bilateral filter comprises applying a bilateral filter only to areas indicated as skin by the skin map.

In further embodiments applying a bilateral filter comprises applying an edge preserving bilateral filter with a local histogram optimization.

Some embodiments pertain to an apparatus that includes a downscaler to receive an image having pixels at an original resolution and to downscale the image from the original resolution to a lower resolution, a buffer to store the downscaled image, a bilateral filter to filter pixels of the lower resolution image, a blender to blend the pixels of the filtered image having the lower resolution with pixels of the image having the original resolution, and a buffer to store the blended image.

Further embodiments include a skin map generator to generate a skin map of the image having the original resolution and wherein the blender uses pixels of the filtered image for areas indicated as skin by the skin map.

Further embodiments include skin map generator to generate a skin map of the downscaled image having a weight for each pixel indicating the probability that each pixel corresponds to skin and wherein the blender applies the weights to combine a pixel of the image at the original resolution with a pixel of the filtered image.

In further embodiments applying the weight comprises multiplying a pixel of the filtered image by a factor based on the weight, and then adding the factored pixel to a corresponding pixel of the original resolution image.

In further embodiments the bilateral filter comprises an edge preserving bilateral filter with a local histogram optimization Some embodiments pertain to a video terminal that includes a camera to generate a sequence of images having pixels at an original resolution, a downscaler to receive the images having pixels at the original resolution and to downscale the images from the original resolution to a lower resolution, a buffer to store the downscaled image, a bilateral filter to filter pixels of the downscaled image, a blender to blend the filtered pixels of the downscaled image with pixels of the image having the original resolution, a buffer to store the blended images, and a display to present the sequence of images after blending.

Further embodiments include a skin map generator to generate a skin map of the downscaled image and wherein the blender uses pixels of the filtered image for areas indicated as skin by the skin map.

Further embodiments include a skin map generator to generate a skin map of the downscaled image having a weight for each pixel indicating the probability that each pixel corresponds to skin and wherein the blender applies the weights to combine a pixel of the image at the original resolution with a pixel of the filtered image.

In further embodiments the blender applies a low threshold to the weights so that if a weight is below the low threshold for a pixel, then the pixel at the original resolution is not combined with the corresponding pixel of the filtered image.

In further embodiments the blender applies a high threshold to the weights so that if a weight is above the high threshold for a pixel, then the pixel at the original resolution is replaced with the corresponding pixel of the filtered image.

In further embodiments applying the weight comprises multiplying a pixel of the filtered image by a factor based on the weight, and then adding the factored pixel to a corresponding pixel of the original resolution image.

Further embodiments include a communications chip to transfer the sequence of images from the terminal.

What is claimed is:

1. An apparatus comprising:
   memory;
   instructions in the apparatus; and
   processor circuitry to execute the instructions to:
   downscale a first image having a first resolution to obtain a second image having a second resolution;
   generate a skin map including weights for first pixels of the first image or second pixels of the second image, the weights indicative of a likelihood that the first pixels or the second pixels correspond to skin;
   compare the weights to a first threshold and a second threshold;
   utilize a first portion of the first pixels in response to a first portion of the weights associated with the first portion of the first pixels not satisfying the first threshold;
   replace a second portion of the first pixels with a first portion of the second pixels in response to a second portion of the weights associated with the second portion of the first pixels satisfying the second threshold; and
   blend a third portion of the first pixels with a second portion of the second pixels in response to a third portion of the weights associated with the third portion of the first pixels satisfying the first threshold and not satisfying the second threshold.

2. The apparatus of claim 1, wherein the second portion of the first pixels and the first portion of the second pixels have corresponding locations in the first image and the second image.

3. The apparatus of claim 1, wherein the processor circuitry is to apply a bilateral filter to a portion of the second image in response to the respective weights associated with ones of the second pixels in the portion of the second image satisfying the first threshold.

4. The apparatus of claim 1, wherein the third portion of the first pixels and the second portion of the second pixels have corresponding locations in the first image and the second image.

5. The apparatus of claim 1, wherein to downscale the first image, the processor circuitry is to downscale a portion of the first image in response to respective weights associated with ones of the first pixels in the portion of the first image satisfying the first threshold.

6. The apparatus of claim 1, wherein to blend the third portion of the first pixels with the second portion of the second pixels, the processor circuitry is to determine a magnitude of an impact of the second portion of the second pixels on the third portion of the first pixels based on the third portion of the weights.

7. The apparatus of claim 1, wherein to blend the third portion of the first pixels with the second portion of the second pixels, the processor circuitry is to:
   multiply first values associated with the second portion of the second pixels by first respective factors based on the third portion of the weights;
   multiply second values associated with the third portion of the first pixels by second respective factors based on the third portion of the weights; and
   add the first values and the second values.

8. A method comprising:
   downscaling a first image having a first resolution to obtain a second image having a second resolution;

accessing a skin map including weights for first pixels of the first image or second pixels of the second image, the weights indicative of a likelihood that the first pixels or the second pixels correspond to skin;

comparing the weights to a first threshold and a second threshold;

preserving a first portion of the first pixels in response to a first portion of the weights associated with the first portion of the first pixels not satisfying the first threshold;

replacing a second portion of the first pixels with a first portion of the second pixels in response to a second portion of the weights associated with the second portion of the first pixels satisfying the second threshold; and blending a third portion of the first pixels with a second portion of the second pixels in response to a third portion of the weights associated with the third portion of the first pixels satisfying the first threshold and not satisfying the second threshold.

9. The method of claim 8, further including applying a bilateral filter to the second image.

10. The method of claim 9, wherein the second portion of the first pixels and the first portion of the second pixels have corresponding locations in the first image and the second image.

11. The method of claim 8, wherein the third portion of the first pixels and the second portion of the second pixels have corresponding locations in the first image and the second image.

12. The method of claim 8, wherein downscaling the first image includes downscaling a portion of the first image in response to respective weights associated with ones of the first pixels in the portion of the first image satisfying the first threshold.

13. The method of claim 8, wherein blending the third portion of the first pixels with the second portion of the second pixels includes determining a magnitude of an impact of the second portion of the second pixels on the third portion of the first pixels based on the third portion of the weights.

14. The method of claim 8, wherein blending the third portion of the first pixels with the second portion of the second pixels includes:

multiplying first values associated with the second portion of the second pixels by first respective factors based on the third portion of the weights;

multiplying second values associated with the third portion of the first pixels by second respective factors based on the third portion of the weights; and adding the first values and the second values.

15. A storage device or disc comprising instructions which, when executed, cause one or more processors to:

downscale a first image having a first resolution to obtain a second image having a second resolution;

generate a skin map including weights for first pixels of the first image or second pixels of the second image, the weights indicative of a likelihood that the first pixels or the second pixels correspond to skin;

compare the weights to a first threshold and a second threshold;

utilize a first portion of the first pixels in response to a first portion of the weights associated with the first portion of the first pixels not satisfying the first threshold;

replace a second portion of the first pixels with a first portion of the second pixels in response to a second portion of the weights associated with the second portion of the first pixels satisfying the second threshold; and blend a third portion of the first pixels with a second portion of the second pixels in response to a third portion of the weights associated with the third portion of the first pixels satisfying the first threshold and not satisfying the second threshold.

16. The storage device or disc of claim 15, wherein the second portion of the first pixels and the first portion of the second pixels have corresponding locations in the first image and the second image.

17. The storage device or disc of claim 15, wherein the third portion of the first pixels and the second portion of the second pixels have corresponding locations in the first image and the second image.

18. The storage device or disc of claim 15, wherein to downscale the first image, the instructions, when executed, cause the one or more processors to downscale a portion of the first image in response to respective weights associated with ones of the first pixels in the portion of the first image satisfying the first threshold.

19. The storage device or disc of claim 15, wherein to blend the third portion of the first pixels with the second portion of the second pixels, the instructions, when executed, cause the one or more processors to determine a magnitude of an impact of the second portion of the second pixels on the third portion of the first pixels based on the third portion of the weights.

20. The storage device or disc of claim 15, wherein the instructions, when executed, cause the one or more processors to:

multiply first values associated with the second portion of the second pixels by first respective factors based on the third portion of the weights;

multiply second values associated with the third portion of the first pixels by second respective factors based on the third portion of the weights; and add the first values and the second values.

\* \* \* \* \*